United States Patent
Takimoto et al.

(10) Patent No.: US 11,694,883 B2
(45) Date of Patent: *Jul. 4, 2023

(54) SAMPLE SUPPORT, SAMPLE IONIZATION METHOD, AND MASS SPECTROMETRY METHOD

(71) Applicant: HAMAMATSU PHOTONICS K.K., Hamamatsu (JP)

(72) Inventors: Miu Takimoto, Hamamatsu-shi (JP); Takayuki Ohmura, Hamamatsu (JP); Masahiro Kotani, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/719,121

(22) Filed: Apr. 12, 2022

(65) Prior Publication Data

US 2022/0238317 A1    Jul. 28, 2022

Related U.S. Application Data

(63) Continuation of application No. 17/259,580, filed as application No. PCT/JP2019/029289 on Jul. 25, 2019, now Pat. No. 11,348,772.

(30) Foreign Application Priority Data

Aug. 6, 2018   (JP) .................................. 2018-147887

(51) Int. Cl.
   *H01J 49/00*   (2006.01)
   *H01J 49/04*   (2006.01)

(52) U.S. Cl.
   CPC ...... *H01J 49/0004* (2013.01); *H01J 49/0418* (2013.01)

(58) Field of Classification Search
   CPC .................... H01J 49/0004; H01J 49/0418
   See application file for complete search history.

(56) References Cited

U.S. PATENT DOCUMENTS

| 7,145,135 B1 | 12/2006 | Overney |
| 11,348,772 B2 * | 5/2022 | Takimoto ............ H01J 49/0004 |

(Continued)

FOREIGN PATENT DOCUMENTS

| EP | 3686590 A1 | 7/2020 |
| JP | 2014-021048 A | 2/2014 |

(Continued)

OTHER PUBLICATIONS

International Preliminary Report on Patentability dated Feb. 18, 2021 for PCT/JP2019/029289.

*Primary Examiner* — Nicole M Ippolito
*Assistant Examiner* — Hanway Chang
(74) *Attorney, Agent, or Firm* — Faegre Drinker Riddle & Reath LLP

(57) ABSTRACT

A sample support is a sample support for sample ionization, including: a substrate formed with a plurality of through holes opening to a first surface and a second surface on a side opposite to the first surface; a conductive layer provided not to block the through hole in the first surface; and a frame body provided in a peripheral portion of the substrate to surround an ionization region in which a sample is ionized when viewed in a thickness direction of the substrate, in which a marker for recognizing a position in the ionization region is provided in the frame body.

14 Claims, 7 Drawing Sheets

(56) References Cited

U.S. PATENT DOCUMENTS

2003/0017455 A1  1/2003  Webb
2005/0045815 A1  3/2005  Bui
2013/0320203 A1  12/2013 Röder et al.

FOREIGN PATENT DOCUMENTS

| JP | 6093492 B1 | 3/2017 |
| WO | WO 2008/068847 A1 | 6/2008 |
| WO | WO 2017/038710 A1 | 3/2017 |
| WO | WO 2017/159879 A1 | 9/2017 |

* cited by examiner

Fig.5
(a)
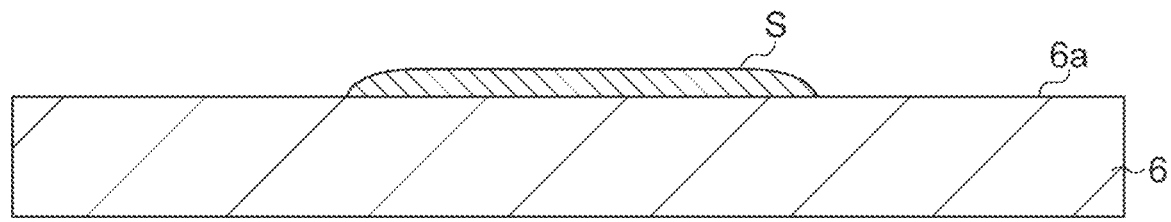
(b)
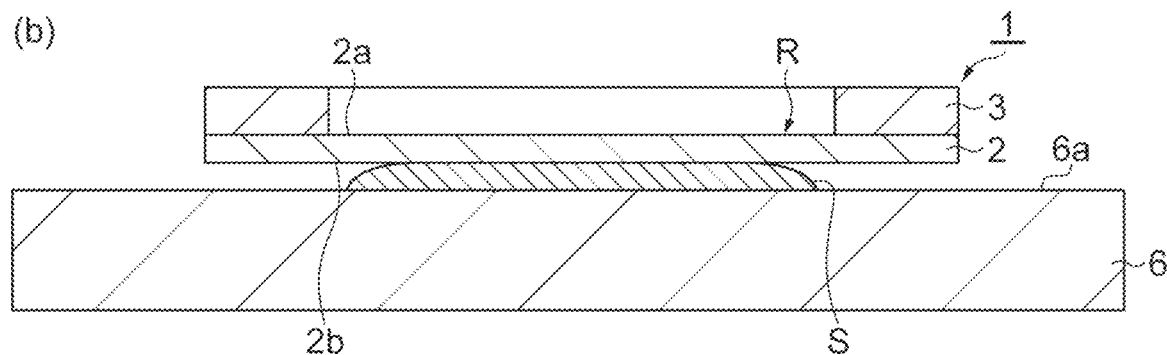
(c)
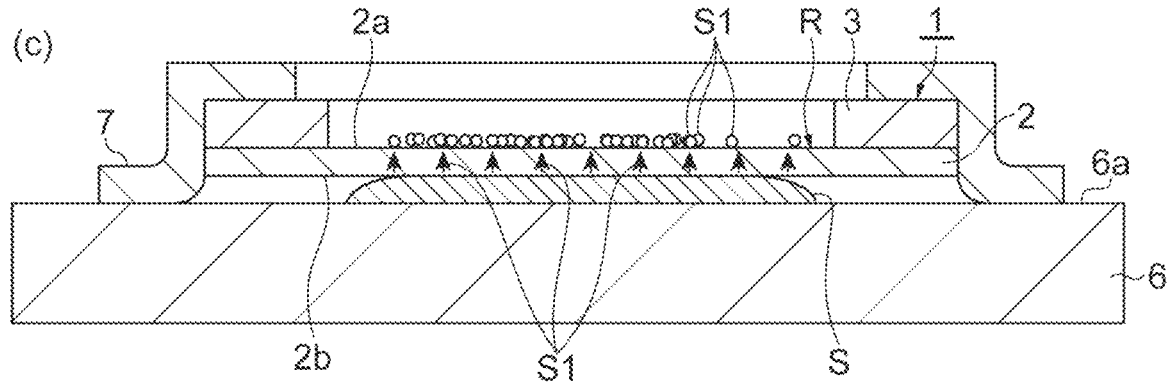

SAMPLE SUPPORT, SAMPLE IONIZATION METHOD, AND MASS SPECTROMETRY METHOD

TECHNICAL FIELD

The present disclosure relates to a sample support, a sample ionization method, and a mass spectrometry method.

BACKGROUND ART

In the related art, a sample support for ionizing a sample is known in mass spectrometry of a sample such as a biological sample (for example, refer to Patent Literature 1). Such a sample support includes a substrate formed with a plurality of through holes opening to a first surface and a second surface on a side opposite to the first surface. In a case where the sample support is disposed on the sample such that the second surface faces the sample, it is possible to lift up the sample from the second surface side of the substrate toward the first surface side through the through hole by using a capillary action. Then, in a case where the first surface side, for example, is irradiated with an energy ray such as laser beam, the sample moved to the first surface side is ionized.

CITATION LIST

Patent Literature

Patent Literature 1: Japanese Patent No. 6093492

SUMMARY OF INVENTION

Technical Problem

In the mass spectrometry as described above, when the first surface side of the substrate is irradiated with the energy ray, it is required that a mass spectrometry device recognizes an irradiation range of the energy ray. However, a visual field of a camera or the like that is attached to the mass spectrometry device is narrow in accordance with the mass spectrometry device, and it is not possible to observe the entire sample support disposed in the mass spectrometry device, and thus, it may not be possible to easily recognize the irradiation range.

Therefore, an object of one aspect of the present disclosure is to provide a sample support, a sample ionization method, and a mass spectrometry method in which an irradiation range of an energy ray can be easily recognized.

Solution to Problem

A sample support according to one aspect of the present disclosure is a sample support for sample ionization, including: a substrate formed with a plurality of through holes opening to a first surface and a second surface on a side opposite to the first surface; a conductive layer provided not to block the through hole in the first surface; and a frame body provided in a peripheral portion of the substrate to surround an ionization region in which a sample is ionized when viewed in a thickness direction of the substrate, in which a marker for recognizing a position in the ionization region is provided in the frame body.

In the sample support, the plurality of through holes opening to the first surface and the second surface on a side opposite to the first surface are formed on the substrate. For this reason, for example, in a case where the sample support is disposed on a sample such as a biological sample such that the second surface of the substrate faces the sample, it is possible to move the sample (a component of the sample) toward the first surface side from the second surface side through the through hole by using a capillary action. Further, for example, in a case where the first surface is irradiated with an energy ray such as laser beam, energy is transmitted to the component of the sample moved to the first surface side via the conductive layer, and thus, it is possible to ionize the component of the sample. In addition, the sample support includes the frame body provided in the peripheral portion of the substrate. For this reason, it is possible to improve the handleability of the sample support by the frame body. In addition, the frame body surrounds the ionization region in which the sample is ionized when viewed in the thickness direction of the substrate, and the marker for recognizing the position in the ionization region is provided in the frame body. Accordingly, the following effects are obtained. That is, for example, a visual field of a camera or the like that is attached to an ionization device irradiating the sample support with an energy ray is narrow, and it may be difficult to specify an irradiation range (a range to be irradiated with the energy ray) by the observation of the ionization region. Even in such a case, it is possible for the ionization device to recognize the irradiation range of the energy ray, by causing the camera or the like to perform scanning and by reading the marker provided in the frame body. Accordingly, according to such a sample support, it is possible to easily recognize the irradiation range of the energy ray.

A width of the through hole may be 1 nm to 700 nm, and a thickness of the substrate may be 1 μm to 50 μm. In this case, it is possible to suitably attain the movement of the component of the sample by the capillary action described above.

A plurality of first markers disposed along a first direction may be provided in a portion of the frame body extending along the first direction, and a plurality of second markers disposed along a second direction orthogonal to the first direction may be provided in a portion of the frame body extending along the second direction. In this case, it is possible to recognize the position in the first direction by the first marker and to recognize the position in the second direction by the second marker. Accordingly, it is possible to easily grasp two-dimensional coordinates of the irradiation range of the energy ray (for example, a start point position, an end point position, and the like).

The marker may be at least one selected from a numeric character, a signal, and a letter. In this case, it is possible to attain the marker suitable for visual contact and/or for reading a device.

The marker may include a marker for visual contact having a width of greater than or equal to a predetermined value and a marker for a device having a width of less than the predetermined value. In this case, for example, it is possible for a measurer to determine in advance the irradiation range by visually reading the marker for visual contact. Further, for example, the marker for a device corresponding to the irradiation range determined by the measurer is read by the camera that is attached to the ionization device, and thus, it is possible for the ionization device to recognize the irradiation range of the energy ray.

A sample support according to another aspect of the present disclosure is a sample support for sample ionization, including: a substrate having conductivity, and formed with a plurality of through holes opening to a first surface and a second surface on a side opposite to the first surface; and a frame body provided in a peripheral portion of the substrate to surround an ionization region in which a sample is ionized when viewed in a thickness direction of the substrate, in which a marker for recognizing a position in the ionization region is provided in the frame body.

According to such a sample support, it is possible to omit the conductive layer and to obtain the same effects as those of the sample support including the conductive layer described above.

A sample ionization method according to one aspect of the present disclosure is a sample ionization method of an ionization device including an irradiation unit configured to apply an energy ray, a scanning unit configured to scan a marker provided in a frame body, and a control unit configured to control an operation of the irradiation unit, the method including: a first step of preparing a sample and the sample support including the conductive layer; a second step of disposing the sample support on the sample such that the second surface faces the sample; a third step of causing the control unit to recognize an irradiation range of the energy ray in the ionization region by causing the scanning unit to scan the marker provided in the frame body; and a fourth step of ionizing a component of the sample moved to the first surface side through the through hole in the irradiation range by causing the control unit to operate the irradiation unit such that the first surface in the irradiation range is irradiated with the energy ray while a voltage is applied to the conductive layer.

In the sample ionization method described above, the plurality of through holes opening to the first surface and the second surface on a side opposite to the first surface are formed on the substrate. In a case where the sample support is disposed on the sample such that the second surface of the substrate faces the sample, the sample (the component of the sample) is moved toward the first surface side from the second surface side through the through hole by a capillary action. Further, in a case where the first surface is irradiated with the energy ray while a voltage is applied to the conductive layer, energy is transmitted to the component of the sample moved to the first surface side. Accordingly, the component of the sample is ionized. In addition, it is possible for the ionization device to easily recognize the irradiation range of the energy ray by scanning the marker provided in the frame body.

A sample ionization method according to another aspect of the present disclosure is a sample ionization method of an ionization device including an irradiation unit configured to apply an energy ray, a scanning unit configured to scan a marker provided in a frame body, and a control unit configured to control an operation of the irradiation unit, the method including: a first step of preparing a sample and the sample support including the substrate having conductivity; a second step of disposing the sample support on the sample such that the second surface faces the sample; a third step of causing the control unit to recognize an irradiation range of the energy ray in the ionization region by causing the scanning unit to scan the marker provided in the frame body; and a fourth step of ionizing a component of the sample moved to the first surface side through the through hole in the irradiation range by causing the control unit to operate the irradiation unit such that the first surface in the irradiation range is irradiated with the energy ray while a voltage is applied to the substrate.

According to such a sample ionization method, it is possible to omit the conductive layer from the sample support and to obtain the same effects as those in the case of using the sample support including the conductive layer as described above.

In the ionization method described above, the marker may include a marker for visual contact having a width of greater than or equal to a predetermined value and a marker for a device having a width of less than the predetermined value, and in the third step, a measurer may determine the irradiation range, on the basis of an existence range of the sample in the ionization region and the marker for visual contact, and the control unit may recognize the irradiation range, on the basis of a position of the scanning unit when the marker for a device corresponding to the irradiation range determined by the measurer is read by the scanning unit. In this case, it is possible to accurately attain both of the determination of the irradiation range by the visual contact of the measurer and the recognition of the irradiation range by a mechanical manipulation (marker scanning) of the ionization device, by the marker provided in the frame body.

A mass spectrometry method, includes: each of the steps of the sample ionization method according to one aspect of the present disclosure described above; a fifth step of detecting the ionized component and of acquiring a distribution image indicating a mass distribution of the sample in the irradiation range; a sixth step of acquiring an optical image including the sample and the sample support, in a state in which the sample support is disposed on the sample; and a seventh step of superimposing the optical image on the distribution image such that the irradiation range of the optical image overlaps with the distribution image, on the basis of the marker in the optical image.

According to the mass spectrometry method described above, it is possible to accurately superimpose the optical image of the sample on the distribution image, on the basis of the marker provided in the frame body of the sample support. As a result thereof, it is possible to visualize the mass distribution in each position of the sample.

Advantageous Effects of Invention

According to one aspect of the present disclosure, it is possible to provide a sample support, a sample ionization method, and a mass spectrometry method in which an irradiation range of an energy ray can be easily recognized.

BRIEF DESCRIPTION OF DRAWINGS

FIG. 5 is a diagram illustrating a procedure of a mass spectrometry method according to one embodiment.

DESCRIPTION OF EMBODIMENTS

Figure 1:
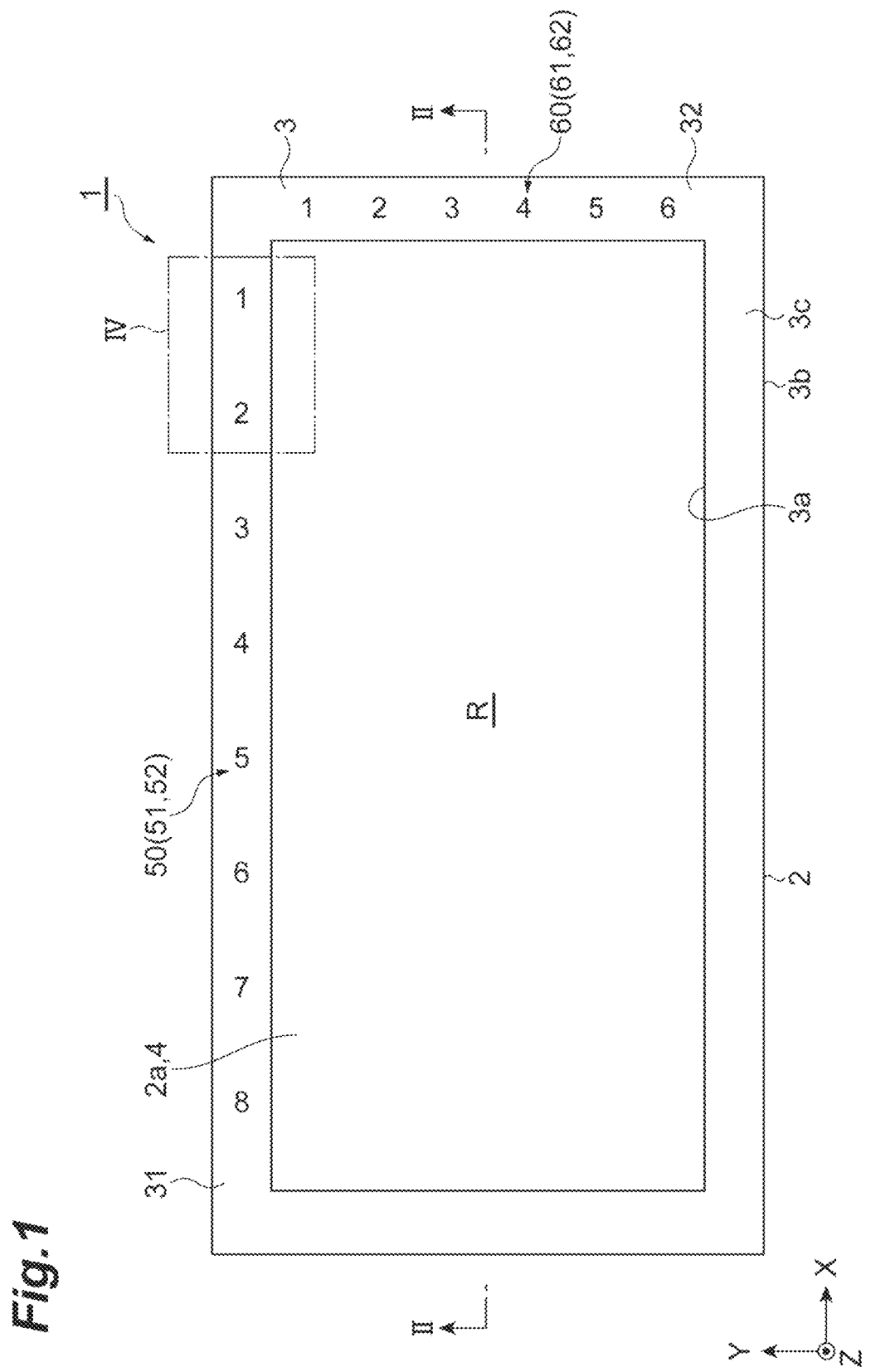
FIG. 1 is a plan view of a sample support according to one embodiment.

Hereinafter, preferred embodiments of the present disclosure will be described in detail, with reference to the drawings. Note that, in each of the drawings, the same reference numerals will be applied to the same portions or the corresponding portions, and the repeated description will be omitted. In addition, dimensions or dimensional ratios of each member (or part) illustrated in the drawings may be different from actual dimensions or dimensional ratios in order to make the description easy to understand.

[Configuration of Sample Support]

Figure 2:
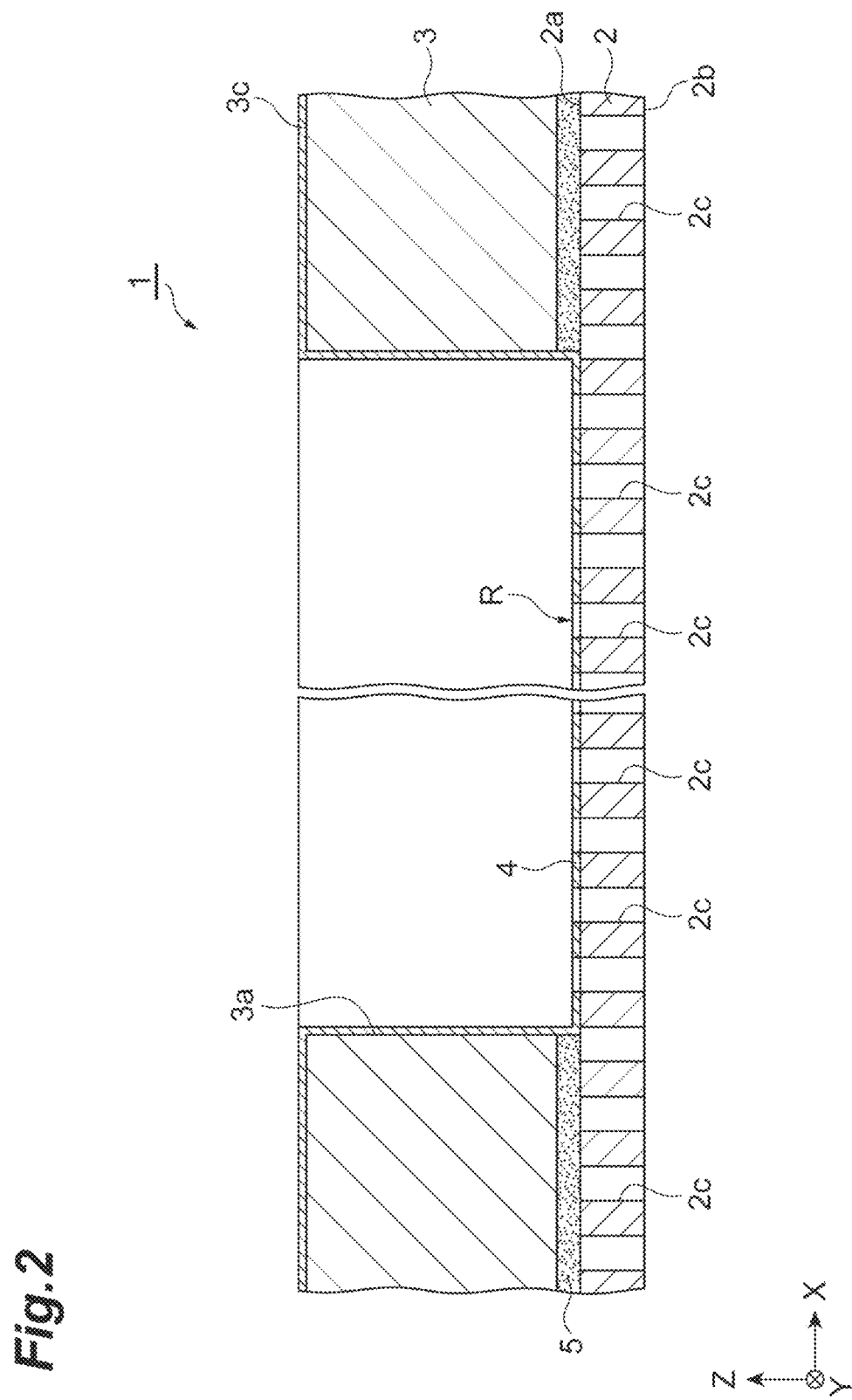
FIG. 2 is a sectional view of the sample support along line II-II illustrated in FIG. 1.

FIG. 1 is a plan view of a sample support 1 of one embodiment. As illustrated in FIG. 1 and FIG. 2, the sample support 1 includes a substrate 2, a frame (a frame body) 3, and a conductive layer 4. The sample support 1 is a sample support for sample ionization. The sample support 1, for example, is used for ionizing a component of a sample that is a measurement target, at the time of performing mass spectrometry.

The substrate 2 includes a first surface 2a and a second surface 2b on a side opposite to the first surface 2a. A plurality of through holes 2c are formed on the substrate 2 uniformly (with a homogeneous distribution). Each of the through holes 2c extends in a thickness direction of the sample support 1 (that is, the substrate 2) (hereinafter, simply referred to as a "thickness direction") and opens to the first surface 2a and the second surface 2b. The thickness direction is a direction perpendicular to the first surface 2a and the second surface 2b. The substrate 2, for example, is formed of an insulating material in a rectangular plate shape. The length of one side of the substrate 2 when viewed in the thickness direction, for example, is approximately several cm to several tens of cm. The thickness of the substrate 2, for example, is approximately 1 μm to 50 μm. In this embodiment, the thickness of the substrate 2 is approximately 5 μm. The substrate 2 is approximately transparent with respect to visible light. For example, the sample described above can be visually recognized via the substrate 2.

The frame 3 is provided on the first surface 2a of the substrate 2. Specifically, the frame 3 is fixed to the first surface 2a of the substrate 2 by an adhesive layer 5. It is preferable to use an adhesive material having less emitted gas (for example, low-melting glass, a vacuum adhesive agent, or the like), as the material of the adhesive layer 5. The frame 3 has a rectangular frame shape. The frame 3 is provided in a peripheral portion of the substrate 2. The frame 3 includes a rectangular inner edge 3a and a rectangular outer edge 3b. The frame 3 surrounds an effective region (an ionization region) R when viewed in the thickness direction. The effective region R is a region that functions in order to move the component of the sample described below to the first surface 2a side in the substrate 2 and to ionize the component of the sample.

The frame 3 has approximately the same outer shape as that of the substrate 2 when viewed in the thickness direction. The length of one side of the frame 3 when viewed in the thickness direction (the length of one side of the outer edge 3b), for example, is approximately several cm to several tens of cm. The length of one side of the inner edge 3a (the effective region R) of the frame 3 when viewed in the thickness direction, for example, is approximately several cm to several tens of cm. The thickness of the frame 3, for example, is less than or equal to 1 mm. The material of the frame 3, for example, is a metal, a ceramic, and the like. According to such a frame 3, the handling of the sample support 1 is facilitated, and the modification of the substrate 2 due to a temperature change or the like is suppressed.

A first marker 50 and a second marker 60 are provided on a surface 3c of the frame 3 on a side opposite to the substrate 2. A plurality of first markers 50 are disposed along an X axis direction in a first portion 31 of the frame 3 extending along the X axis direction (a first direction). The first marker 50, for example, is a plurality of numeric characters arranged along the X axis direction. Similarly, a plurality of second markers 60 are disposed along a Y axis direction in a second portion 32 of the frame 3 extending along the Y axis direction (a second direction orthogonal to the first direction). The second marker 60, for example, is a plurality of numeric characters arranged along the Y axis direction. The first marker 50 and the second marker 60 configure a coordinate system for recognizing a position in the effective region R when viewed in the thickness direction. The first marker 50 and the second marker 60, for example, are formed by making the surface 3c of the frame 3 concave and convex.

The conductive layer 4 is provided on the first surface 2a of the substrate 2. Specifically, the conductive layer 4 is continuously (integrally) formed in a region corresponding to the inner edge 3a of the frame 3 (that is, a region corresponding to the effective region R) on the first surface 2a of the substrate 2, an inner surface of the inner edge 3a, and the surface 3c of the frame 3. In the effective region R, the conductive layer 4 is provided in a peripheral portion of the through hole 2c on the first surface 2a. That is, the conductive layer 4 covers a portion in the first surface 2a of the substrate 2, on which the through hole 2c is not formed. That is, the conductive layer 4 is provided not to block the through hole 2c. In the effective region R, each of the through holes 2c is exposed to the inner edge 3a. The conductive layer 4 covers the first marker 50 and the second marker 60 on the surface 3c of the frame 3. However, the first marker 50 and the second marker 60 are formed by making the surface 3c concave and convex, and thus, the visual contact and the recognition of the device are not hindered even in the case of being covered with the conductive layer 4.

The conductive layer 4 is formed of a conductive material. Here, it is preferable that a metal having low affinity (reactivity) with respect to a sample and high conductivity is used as the material of the conductive layer 4, from the following reasons.

For example, in a case where the conductive layer 4 is formed of a metal such as copper (Cu) having high affinity with respect to a sample such as protein, in a process of ionizing the sample described below, the sample is ionized in a state where Cu atoms are attached to sample molecules, and thus, there is a concern that a detection result is shifted in a mass spectrometry method described below as the Cu atoms are attached. Therefore, it is preferable that a metal having low affinity with respect to the sample is used as the material of the conductive layer 4.

On the other hand, a metal having high conductivity easily and stably applies a constant voltage. For this reason, in a case where the conductive layer 4 is formed of the metal having high conductivity, it is possible to homogeneously apply a voltage to the first surface 2a of the substrate 2. In addition, there is a tendency that the metal having high conductivity also has high thermal conductivity. For this reason, in a case where the conductive layer 4 is formed of the metal having high conductivity, it is possible to efficiently transfer the energy of an energy ray such as laser beam that is applied to the substrate 2 to the sample via the conductive layer 4. Therefore, it is preferable that the metal having high conductivity is used as the material of the conductive layer 4.

From the viewpoint described above, for example, it is preferable that gold (Au), platinum (Pt), and the like are used as the material of the conductive layer 4. The conductive layer 4, for example, is formed to have a thickness of approximately 1 nm to 350 nm by a plating method, an atomic layer deposition (ALD) method, an evaporation method, a sputtering method, and the like. In this embodiment, the thickness of the conductive layer 4 is approximately 10 nm. Note that, for example, chromium (Cr), nickel (Ni), titanium (Ti), and the like may be used as the material of the conductive layer 4.

Figure 3:
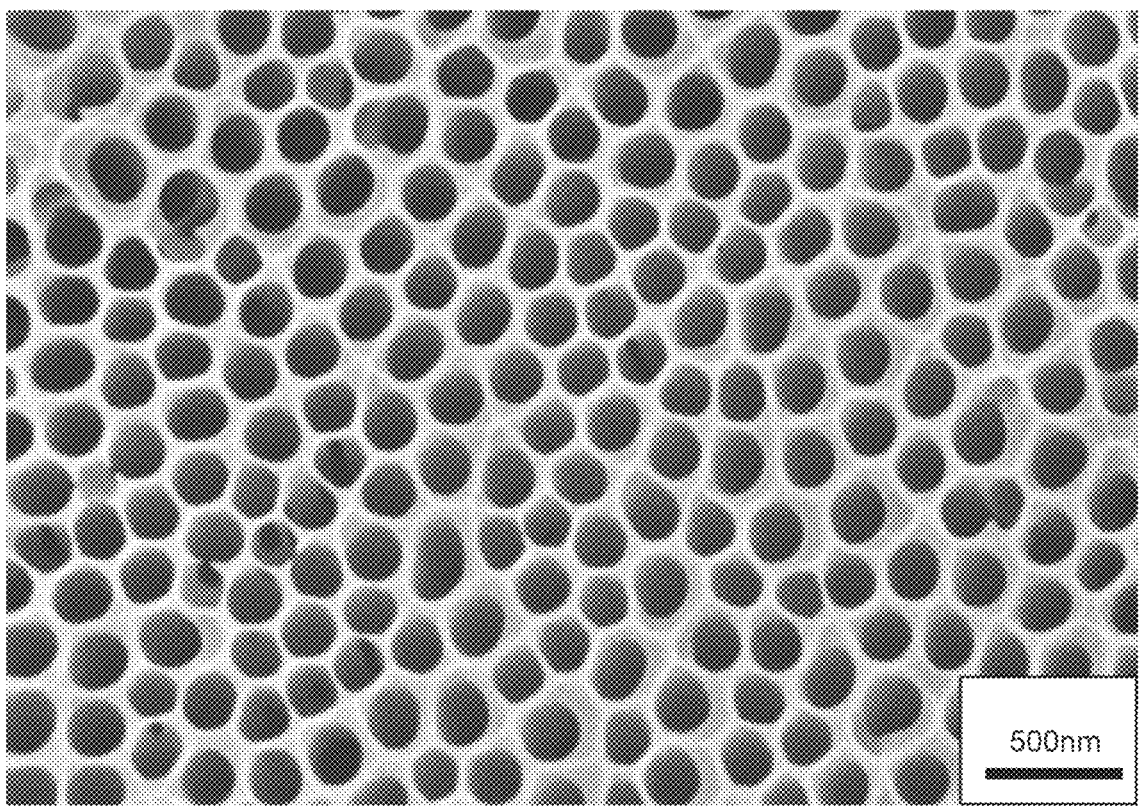
FIG. 3 is a diagram illustrating an enlarged image of an effective region in a substrate viewed in a thickness direction of the substrate illustrated in FIG. 1.

FIG. 3 is a diagram illustrating an enlarged image of the substrate 2 when viewed in the thickness direction. In FIG. 3, a black portion is the through hole 2c, and a white portion is a partition portion between the through holes 2c. As illustrated in FIG. 3, the plurality of through holes 2c having an approximately constant width are uniformly formed on the substrate 2. The through hole 2c, for example, is approximately in a circle shape when viewed in the thickness direction. The width of the through hole 2c, for example, is approximately 1 nm to 700 nm. In this embodiment, the width of the through hole 2c is approximately 200 nm. The width of the through hole 2c indicates the diameter of the through hole 2c in a case where the through hole 2c is approximately in a circle shape when viewed in the thickness direction, and indicates the diameter (an effective diameter) of a virtual maximum cylinder falling into the through hole 2c in a case where the through hole 2c is not approximately in a circle shape. A pitch between the respective through holes 2c, for example, is approximately 1 nm to 1000 nm. In a case where the through hole 2c is approximately in a circle shape when viewed in the thickness direction, the pitch between the respective through holes 2c indicates a center-to-center distance of the respective circles, and in a case where the through hole 2c is not approximately in a circle shape, the pitch between the respective through holes 2c indicates a center axis-to-center axis distance of the virtual maximum cylinder falling into the through hole 2c. The width of the partition portion between the through holes 2c on the substrate 2, for example is approximately 300 nm.

An opening rate of the through holes 2c (a ratio of all of the through holes 2c to the first surface 2a when viewed in the thickness direction) is practically 10% to 80%, and is particularly preferably 50% to 80%. The sizes of the plurality of through holes 2c may be uneven with each other, and the plurality of through holes 2c may be partially connected to each other.

The substrate 2, for example, is an alumina porous film that is formed by performing anodic oxidation with respect to aluminum (Al). Specifically, an anodic oxidation treatment is performed with respect to an Al substrate, and a surface portion that is oxidized is peeled off from the Al substrate, and thus, the substrate 2 can be obtained. Note that, the substrate 2 may be formed by performing anodic oxidation with respect to a valve metal other than Al, such as tantalum (Ta), niobium (Nb), titanium (Ti), hafnium (Hf), zirconium (Zr), zinc (Zn), tungsten (W), bismuth (Bi), and antimony (Sb), or may be formed by performing anodic oxidation with respect to silicon (Si).

Figure 4:
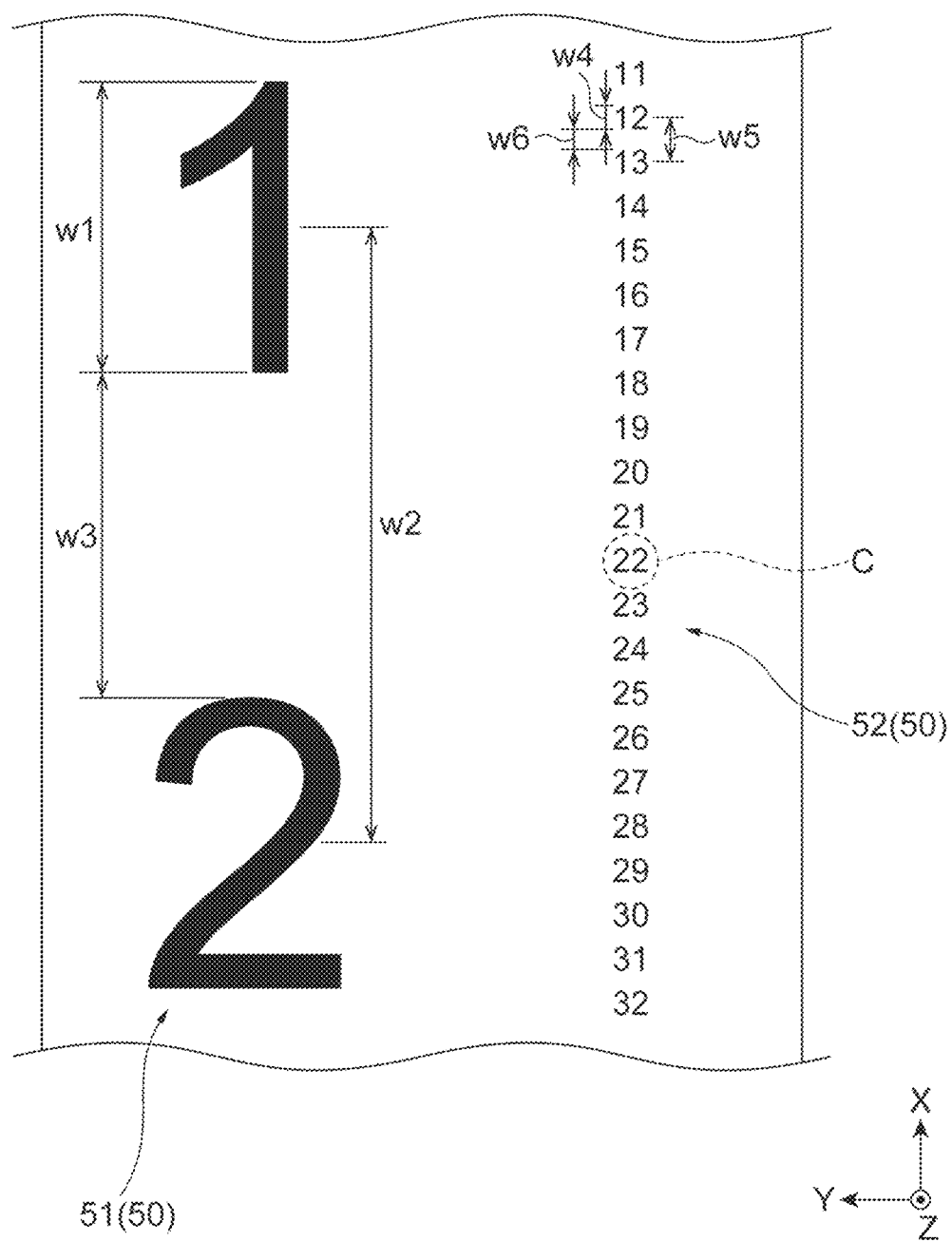
FIG. 4 is an enlarged view of a frame illustrated in FIG. 1.

FIG. 4 is an enlarged view of the frame 3. As illustrated in FIG. 4, the first marker 50 includes a marker 51 for visual contact and a marker 52 for a device. The marker 51 for visual contact is a marker to be read by the visual contact of a measurer. A plurality of markers 51 for visual contact are disposed along the X axis direction. The plurality of markers 51 for visual contact, for example, are arranged at regular intervals along the X axis direction. In this embodiment, as an example, each of the markers 51 for visual contact is a numeric character. A width w1 of the marker 51 for visual contact can be recognized by the visual contact of the measurer. The width w1 of the marker 51 for visual contact is greater than or equal to a predetermined value (for example, 1 mm).

The width w1 of the marker 51 for visual contact, for example, is approximately 1 mm to 4 mm. A pitch w2 between the markers 51 for visual contact adjacent to each other (that is, a distance between the centers of the markers 51 for visual contact adjacent to each other), for example, is approximately 2 mm to 10 mm. A length w3 of a space between the markers 51 for visual contact adjacent to each other, for example, is approximately 1 mm to 9 mm. In this embodiment, as an example, the width w1 of the marker 51 for visual contact is approximately 1 mm, the pitch w2 between the markers 51 for visual contact is approximately 2 mm, and the length w3 of the space between the markers 51 for visual contact is approximately 1 mm. The marker 51 for visual contact, for example, is provided by forming concavities and convexities on the surface 3c of the frame 3, in accordance with a punch mark using stamping or laser. An engraved height (a depth) of the marker 51 for visual contact, for example, is approximately 0.1 mm to 0.9 mm.

The marker 52 for a device, for example, is a marker to be read by a camera 16 (refer to FIG. 7) that is attached to a mass spectrometry device 10 (an ionization device) described below. In this embodiment, as an example, the marker 52 for a device is positioned inside the frame 3 from the marker 51 for visual contact. A plurality of markers 52 for a device are disposed along the X axis direction. The plurality of markers 52 for a device, for example, are arranged at regular intervals along the X axis direction. In this embodiment, as an example, each of the markers 52 for a device is a numeric character.

A width w4 of the marker 52 for a device is less than the width w1 of the marker 51 for visual contact. That is, the width w4 of the marker 52 for a device is less than a predetermined value. The width w4 of the marker 52 for a device, for example, is approximately 1 nm to 0.1 mm. A pitch w5 between the markers 52 for a device adjacent to each other (that is, a distance between the centers of the markers 52 for a device adjacent to each other) is less than the pitch w2 of the marker 51 for visual contact. The pitch w5 between the markers 52 for a device, for example, is approximately 5 nm to 0.2 mm. A length w6 of a space between the markers 52 for a device adjacent to each other, for example, is approximately 4 nm to 0.1 mm. In this embodiment, as an example, the width w4 of the marker 52 for a device is approximately 40 μm, the pitch w5 between the markers 52 for a device is approximately 110 μm, and the length w6 of the space between the markers 52 for a device is approximately 70 μm. The marker 52 for a device, for example, is provided by forming concavities and convexities on the surface 3c of the frame 3, in accordance with a punch mark (as an example, shallow engraving) using laser. An engraved height (a depth) of the marker 52 for a device, for example, is approximately 5 μm. Note that, as the punch mark using the laser, for example, a method such as deep engraving may be applied. The engraved height of the marker 52 for a device is different in accordance with each method.

Note that, a positional relationship between the plurality of markers 51 for visual contact and the plurality of markers 52 for a device, for example, is stored in a correspondence table that is prepared in advance. The measurer is capable of grasping that a marker "14" or "15" of the marker 52 for a device corresponds to a center position of a marker "1" of the marker 51 for visual contact in the X axis direction, or an intermediate position of markers "1" and "2" of the marker 51 for visual contact in the X axis direction corresponds to a marker "22" of the marker 52 for a device, with reference to such a correspondence table. Note that, the correspondence table may be saved on paper or the like, or may be saved in a storage device (a memory, a storage, or the like) of a computer as data.

As with the first marker 50, the second marker 60 also includes a marker 61 for visual contact (refer FIG. 1) and a marker 62 for a device (refer FIG. 1). That is, the marker 61 for visual contact is a marker to be read by the visual contact of the measurer. A plurality of markers 61 for visual contact are disposed along the Y axis direction. The plurality of markers 61 for visual contact, for example, are arranged at regular intervals along the Y axis direction. In this embodiment, as an example, each of the markers 61 for visual contact is a numeric character. The width of the marker 61 for visual contact, a pitch between the adjacent markers 61 for visual contact, and the length of a space between the adjacent markers 61 for visual contact are identical to the width w1 of the marker 51 for visual contact, the pitch w2 between the adjacent markers 51 for visual contact, and the length w3 of the space between the adjacent markers 51 for visual contact, described above. The marker 62 for a device, for example, is a marker to be read by the camera 16 that is attached to the mass spectrometry device 10. In this embodiment, as an example, the marker 62 for a device is positioned inside the frame 3 from the marker 61 for visual contact. The plurality of markers 62 for a device are disposed along the Y axis direction. The plurality of markers 62 for a device, for example, are arranged at regular intervals along the Y axis direction. In this embodiment, as an example, each of the markers 62 for a device is a numeric character. The width of the marker 62 for a device, a pitch between the adjacent markers 62 for a device, and the length of a space between the adjacent markers 62 for a device are identical to the width w4 of the marker 52 for a device, the pitch w5 between the adjacent markers 52 for a device, and the length w6 of the space between the adjacent markers 52 for a device, described above.

[Sample Ionization Method]

Figure 6:
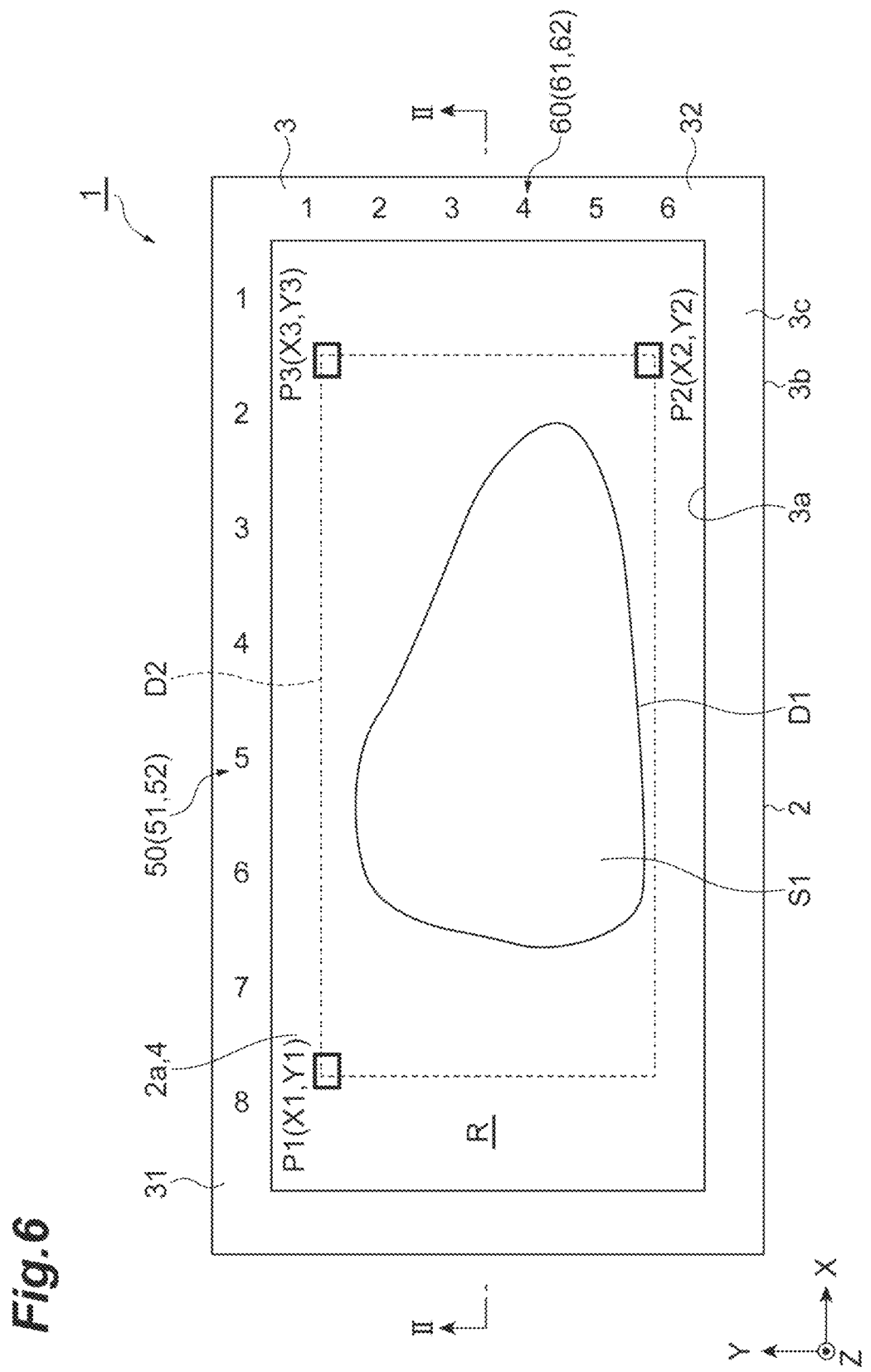
FIG. 6 is a diagram illustrating the procedure of the mass spectrometry method according to one embodiment.
Figure 7:
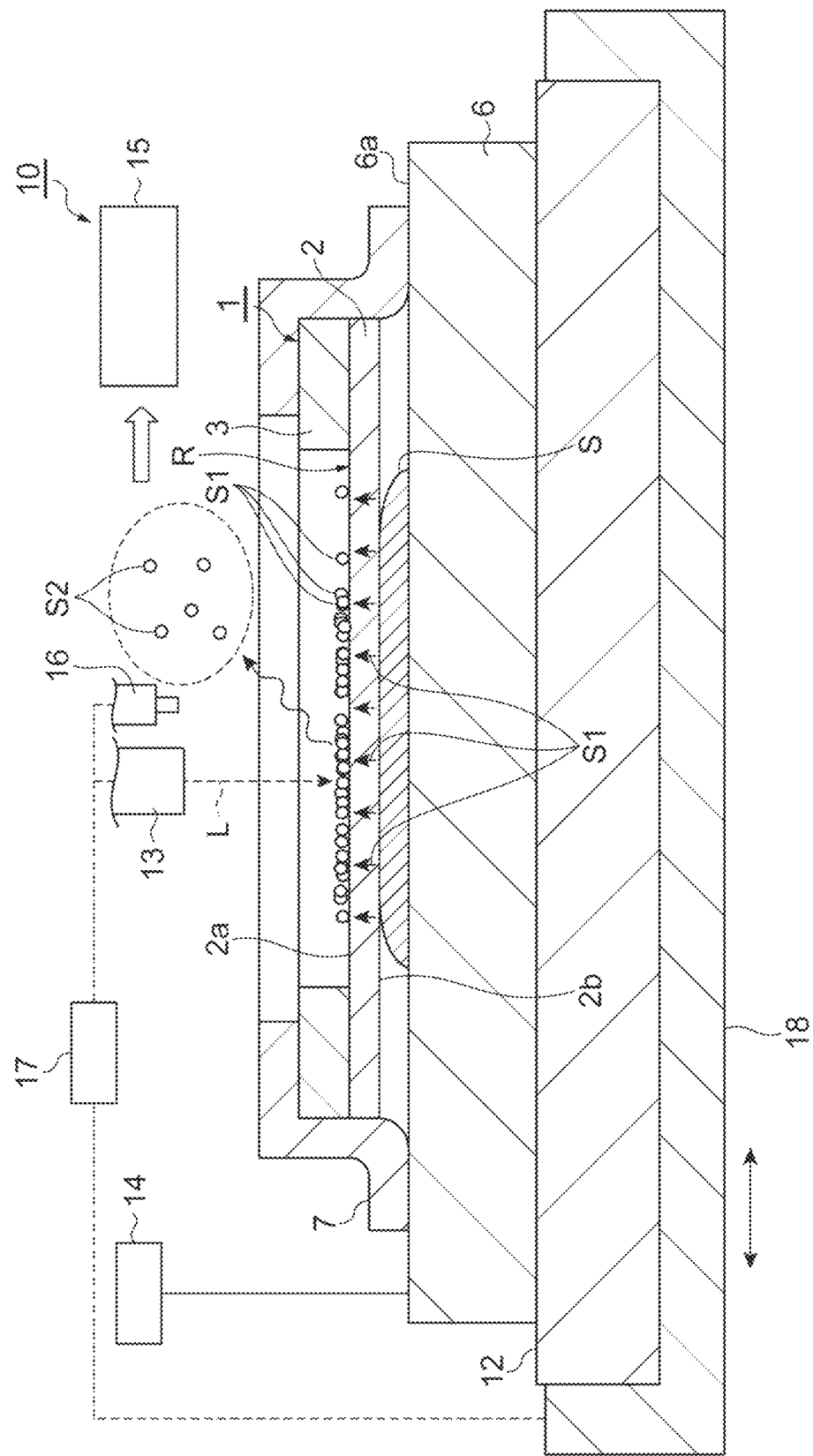
FIG. 7 is a diagram illustrating the procedure of the mass spectrometry method according to one embodiment.

Next, a sample ionization method using the sample support 1 will be described with reference to FIG. 5 to FIG. 7. Here, as an example, a laser desorption/ionization method using laser beam (an energy ray) (a part of a mass spectrometry method of a mass spectrometry device 10) will be described. In FIG. 5 and FIG. 7, the through hole 2c, the conductive layer 4, and the adhesive layer 5 in the sample support 1 are not illustrated.

First, as illustrated in (a) of FIG. 5, a sample S is prepared (a first step). Specifically, the sample S is mounted on a mounting surface 6a of a glass slide (a mounting portion) 6. The glass slide 6 is a glass substrate on which a transparent conductive film such as an indium tin oxide (ITO) film is formed, and the surface of the transparent conductive film is the mounting surface 6a. Note that, not only the glass slide 6 but also a member that is capable of ensuring conductivity (for example, a substrate formed of a metal material such as stainless steel, or the like) can be used as the mounting portion. Here, the sample S, for example, is a biological sample (a hydrous sample). The sample S, for example, is a liver slice of a mouse, or the like. In order to smoothly move a component S1 of the sample S (refer to (c) of FIG. 5), a solution for decreasing the viscosity of the component S1 (for example, an acetonitrile mixed liquid, acetone, or the like) may be added to the sample S.

Subsequently, as illustrated in (b) of FIG. 5, the sample support 1 described above is prepared (the first step). The sample support 1 may be prepared by being manufactured by a person who carries out the ionization method and the mass spectrometry method, or may be prepared by being acquired from a manufacturer, a seller, or the like of the sample support 1. Subsequently, the sample support 1 is disposed on the sample S such that the second surface 2b faces the sample S (a second step). The sample support 1 is disposed on the sample S such that the second surface 2b is in contact with the sample S.

Subsequently, as illustrated in (c) of FIG. 5, the sample support 1 is fixed to the glass slide 6. The sample support 1 is fixed to the glass slide 6 by a tape 7 having conductivity (for example, a carbon tape or the like). The tape 7 fixes the sample support 1 such that the first marker 50 and the second marker 60 are exposed. That is, the first marker 50 and the second marker 60 are not covered with the tape 7. Alternatively, for example, the tape 7 is formed of a transparent material, and thus, in a case where the first marker 50 and the second marker 60 can be read by the camera 16 described below even when the first marker 50 and the second marker 60 are covered with the tape 7, the first marker 50 and the second marker 60 may be covered with the tape 7. The tape 7 may be a part of the sample support 1, or may be prepared separately from the sample support 1. In a case where the tape 7 is a part of the sample support 1 (that is, in a case where the sample support 1 includes the tape 7), for example, the tape 7 may be fixed in advance to the surface 3c side of the frame 3. More specifically, the tape 7 may be fixed onto the conductive layer 4 that is formed on the surface 3c of the frame 3.

The component S1 of the sample S is moved toward the first surface 2a side of the substrate 2 from the second surface 2b side of the substrate 2 through the through hole 2c by a capillary action. The component S1 that is moved to the first surface 2a side of the substrate 2 is accumulated on the first surface 2a side by a surface tension. FIG. 6 is a plan view illustrating a state in which the sample support 1 is disposed on the sample S. As illustrated in FIG. 6, the component S1 of the sample S is moved to the first surface 2a side in a region D1 of the effective region R (an existence range of the sample S). Subsequently, the camera 16 scans the first marker 50 and the second marker 60 provided in the frame 3, and thus, an irradiation range D2 of laser beam L in the effective region R is recognized by a control unit 17 (refer to FIG. 7) (a third step).

Specifically, first, the measurer determines the irradiation range D2, on the basis of the region D1 and the marker 51 for visual contact and the marker 61 for visual contact. More specifically, in a case where the sample support 1 is disposed on the sample S, the measurer, for example, determines a region including the region D1 as the irradiation range D2, by the visual contact. In this embodiment, as an example, the irradiation range D2 has a rectangle shape surrounded by a pair of side portions extending in the X axis direction and a pair of side portions extending in the Y axis direction. Then, the measurer grasps coordinates (X1,Y1) and (X2,Y2) of a start point P1 and an end point P2 of the irradiation range D2, on the basis of the marker 51 for visual contact and the marker 61 for visual contact, respectively. The coordinates (X1,Y1) and (X2,Y2) are coordinates in a coordinate system configured of the marker 51 for visual contact and the marker 61 for visual contact. Here, as an example, (X1,Y1) is (7.9,1.1), and (X2,Y2) is (1.5,5.9). Note that, the coordinates that are grasped as described above are values presumed by the visual contact of the measurer.

Subsequently, as illustrated in FIG. 7, in a state where the sample S is disposed between the glass slide 6 and the sample support 1, the glass slide 6, the sample support 1, and the sample S are mounted on a support portion 12 of the mass spectrometry device 10.

The mass spectrometry device 10 includes the support portion 12, a sample stage 18, the camera 16 (a scanning unit), an irradiation unit 13, a voltage application unit 14, an ion detection unit 15, and the control unit 17. The sample S or the like that is a spectrometry target is mounted on the support portion 12. The support portion 12 on which the sample S or the like is mounted is mounted on the sample stage 18. The sample S or the like mounted on the support portion 12 is observed by the camera 16. Here, the width of an observation range (a visual field) C (refer to FIG. 4) of the camera 16, for example, is approximately 1.5 mm. That is, the visual field of the camera 16 is smaller than the effective region R, and has at least a size capable of observing the markers 52 and 62 for a device. The irradiation unit 13 irradiates the first surface 2a of the sample support 1 with the energy ray such as the laser beam L. The voltage application unit 14 applies a voltage to the first surface 2a of the sample support 1. The ion detection unit 15 detects ions of the sample S that is ionized. The control unit 17 controls the operations of the sample stage 18, the camera 16, the irradiation unit 13, the voltage application unit 14, and the ion detection unit 15. The control unit 17, for example, is a computer device including a processor (for example, a central processing unit [CPU]), a memory (for example, a read only memory [ROM], a random access memory [RAM], or the like), and the like.

Subsequently, the control unit 17 recognizes irradiation range D2, on the basis of the marker 52 for a device and the marker 62 for a device. For example, first, the control unit 17 conveys the sample support 1 to the sample stage 18 up to a position in which the marker 52 for a device provided in the frame 3 is imaged by the camera 16. Specifically, the control unit 17 positions the sample support 1 such that a target marker 52 for a device falls within the observation range C of the camera 16 (refer to FIG. 4), by moving the sample stage 18 such that the camera 16 scans the markers 52 for a device arrayed along the X axis direction. Here, the control unit 17 acquires in advance the marker 52 for a device corresponding to the coordinate X1 (here, 7.9) of the start point P1 and the coordinate X2 (here, 1.5) of the end point P2, which are grasped by the visual contact of the measurer. Such acquisition of the marker 52 for a device, for example, can be attained by an input manipulation of the measurer with respect to a computer configuring the control unit 17. Then, the control unit 17 recognizes (stores) the X coordinate of the start point P1 of the irradiation range D2, on the basis of a position x1 of the sample stage 18 in the X axis direction when the marker 52 for a device corresponding to the coordinate X1 of the start point P1 is read by the camera 16. That is, the control unit 17 recognizes the position x1 as the X coordinate of the start point P1. Similarly, the control unit 17 recognizes (stores) the X coordinate of the end point P2 of the irradiation range D2, on the basis of a position x2 of the sample stage 18 in the X axis direction when the marker 52 for a device corresponding to the coordinate X2 of the end point P2 is read by the camera 16. That is, the control unit 17 recognizes the position x2 as the X coordinate of the end point P2.

Similarly, the control unit 17 conveys the sample support 1 to the sample stage 18 up to a position in which the marker 62 for a device provided in the frame 3 is imaged by the camera 16. Specifically, the control unit 17 positions the sample support 1 such that a target marker 62 for a device falls within the observation range C of the camera 16, by moving the sample stage 18 such that the camera 16 scans the markers 62 for a device arrayed along the Y axis direction. Here, the control unit 17 acquires in advance the marker 62 for a device corresponding to the coordinate Y1 (here, 1.1) of the start point P1 and the coordinate Y2 (here, 5.9) of the end point P2, which are grasped by the visual contact of the measurer. Such acquisition of the marker 62 for a device can be attained by the same method as the acquisition of the marker 52 for a device described above. Then, the control unit 17 recognizes (stores) the Y coordinate of the start point P1 of the irradiation range D2, on the basis of a position y1 of the sample stage 18 in the Y axis direction when the marker 62 for a device corresponding to the coordinate Y1 of the start point P1 is read by the camera 16. That is, the control unit 17 recognizes the position y1 as the Y coordinate of the start point P1. Similarly, the control unit 17 recognizes (stores) the Y coordinate of the end point P2 of the irradiation range D2, on the basis of a position y2 of the sample stage 18 in the Y axis direction when the marker 62 for a device corresponding to the coordinate Y2 of the end point P2 is read by the camera 16. That is, the control unit 17 recognizes the position y2 as the Y coordinate of the end point P2.

As described above, the control unit 17 is capable of recognizing the positions (x1,y1) and (x2,y2) of the start point P1 and the end point P2, respectively, by causing the camera 16 to scan the plurality of markers 52 for a device arrayed along the X axis direction and the plurality of markers 62 for a device arrayed along the Y axis direction. Accordingly, the control unit 17 recognizes the irradiation range D2. Note that, the coordinates (X1,Y1) and (X2,Y2) are the coordinates in the coordinate system configured of the marker 51 for visual contact and the marker 61 for visual contact of the frame 3, whereas the positions (x1,y1) and (x2,y2) are a control coordinate system that is used by the control unit 17. That is, the positions (x1,y1) and (x2,y2) are a position referred to when the irradiation unit 13 performs scanning Here, the coordinates (X1,Y1) of the start point P1 and the coordinates (X2,Y2) of the end point P2 correspond to the positions (x1,y1) and (x2,y2). From such a correspondence relationship, the coordinate system configured of the marker 51 for visual contact and the marker 61 for visual contact of the frame 3 and the control coordinate system can be exchanged each other.

Subsequently, a voltage is applied to the conductive layer 4 of the sample support 1 (refer to FIG. 2) via the mounting surface 6a of the glass slide 6 and the tape 7 by the voltage application unit 14 (a fourth step). Subsequently, the control unit 17 operates the irradiation unit 13, on the basis of irradiation range D2 that is recognized by the control coordinate system (that is, a range that is specified by the positions (x1,y1) and (x2,y2)). Specifically, the control unit 17 operates the irradiation unit 13 such that the first surface 2a in the irradiation range D2 is irradiated with the laser beam L (the fourth step). Accordingly, the irradiation unit 13 scans the first surface 2a in the irradiation range D2 with the laser beam L.

As an example, the control unit 17 moves the sample stage 18, and controls an irradiation operation (an irradiation timing or the like) of the laser beam L by the irradiation unit 13, as the control of the operation of the irradiation unit 13. That is, the control unit 17 checks that the sample stage 18 is moved by a predetermined interval, and then, executes the irradiation of the laser beam L with respect to the irradiation unit 13. Specifically, first, the control unit 17 moves the sample stage 18, and thus, the irradiation position of the laser beam L by the irradiation unit 13 is adjusted to the position (x1,y1) corresponding to the start point P1 of the irradiation range D2. Then, the laser beam L is applied to the position (x1,y1) of the start point P1. Subsequently, the control unit 17 moves the sample stage 18, and thus, the irradiation position of the laser beam L by the irradiation unit 13 is adjusted to a position separated from the position (x1,y1) in the X axis direction by a predetermined interval (a laser irradiation interval set in advance), and the laser beam L is applied to the position. By repeating such a manipulation, the laser beam L is sequentially applied at each predetermined interval in the X axis direction. Then, in a case where the irradiation position of the laser beam L reaches an edge portion of the irradiation range D2 (that is, a position (x2,y1) corresponding to coordinates (X3,Y3) of a turn-around point P3 in FIG. 6), the control unit 17 moves the sample stage 18, and thus, the irradiation position of the laser beam L by the irradiation unit 13 is adjusted to a position separated from the immediately preceding irradiation position in the Y axis direction by a predetermined interval, and the laser beam L is applied to the position. Subsequently, the laser beam L is applied to a position separated from the immediately preceding irradiation position in the X axis direction by a predetermined interval. The laser beam L sequentially applied at each predetermined interval in the X axis direction. As described above, the laser beam L is scanned in a meander shape in the irradiation range D2, and then, reaches the position (x2,y2) of the end point P2. As described above, the first surface 2a in the irradiation range D2 is scanned with the laser beam L. Note that, the scanning of the laser beam L with respect to the first surface 2a can be carried out by operating at least one of the sample stage 18 and the irradiation unit 13. In a case where the irradiation unit 13 is operated, the control unit 17 controls the operation of the irradiation unit 13, and controls both of the movement of the irradiation unit 13 and the irradiation operation of the laser beam L by the irradiation unit 13.

As described above, the first surface 2a in the irradiation range D2 is irradiated with the laser beam L while a voltage is applied to the conductive layer 4, and thus, the component S1 that is moved to the first surface 2a side through the through hole 2c in the irradiation range D2 is ionized, and a sample ion S2 (the component S1 that is ionized) is emitted. Specifically, energy is transmitted from the conductive layer 4 absorbing the energy of the laser beam L to the component S1 that is moved to the first surface 2a side of the substrate 2, and the component S1 obtaining the energy is gasified and obtains a charge, and thus, the sample ion S2 is obtained. Each of the steps described above corresponds to the ionization method of the sample S, using the sample support 1 (here, as an example, a laser desorption/ionization method as a part of the mass spectrometry method).

The sample ion S2 that is emitted is moved toward a ground electrode (not illustrated) that is provided between the sample support 1 and an ion detection unit 15 while being accelerated. That is, the sample ion S2 is moved toward the ground electrode while being accelerated by a potential difference that occurs between the conductive layer 4 to which a voltage is applied and the ground electrode. Then, the sample ion S2 is detected by the ion detection unit 15 (a fifth step).

A detection result of the sample ion S2 by the ion detection unit 15 is associated with the irradiation position of the laser beam L. Specifically, the ion detection unit 15 detects the sample ion S2 in each position in the irradiation range D2 to which the laser beam L is applied, as described above. An identification number indicating each position (that is, the position to which the laser beam L is applied) (for example, the coordinates or the like in the control coordinate system, such as (x1,y1) described above) is applied to the data (the detection result) of the sample ion S2 detected in each position in the irradiation range D2. Accordingly, a distribution image (MS mapping data) indicating a mass distribution of the sample S in the irradiation range D2 is acquired. Further, it is possible to image a two-dimensional distribution of molecules configuring the sample S. Note that, here, the mass spectrometry device 10 is a mass spectrometry device using a time-of-flight mass spectrometry (TOF-MS) method.

Subsequently, in a state where the sample support 1 is disposed on the sample S, an optical image of the sample S and the sample support 1 is acquired (a sixth step). Here, the acquired optical image includes at least of the region D1 in the effective region R, and the first marker 50 and the second marker 60. Subsequently, the optical image is superimposed on the distribution image such that the irradiation range D2 in the optical image overlaps with the distribution image of the sample S, on the basis of the marker 51 for visual contact and the marker 61 for visual contact in the optical image (a seventh step). Specifically, the position (x1,y1) of the start point P1 and the position (x2,y2) of the end point P2 in the distribution image are superimposed on the coordinates (X1,Y1) of the start point P1 and the coordinates (X2,Y2) of the end point P2 in the optical image, respectively. Accordingly, the optical image of the sample S and the distribution image are synthesized. Note that, the substrate 2 is approximately transparent with respect to visible light, and thus, even in a case where the sample support 1 is disposed on the sample S, it is possible to acquire the optical image of the sample S. Each of the steps described above corresponds to the mass spectrometry method using the sample support 1.

After the observation (optical observation) of the optical image of the sample S and the distribution image of the sample S that are synthesized together, detailed screening of a liquid chromatography-mass spectrometry (LC-MS) method may be further performed with respect to a portion having specific data in the sample S. In such a case, for example, an identification number such as the information of the irradiation position is applied to the specific data, and thus, it is possible to specify the irradiation position and the coordinates in the sample support 1, on the basis of the identification number. Accordingly, it is possible to supply a sample of the sample S in the coordinates to LC-MS.

As described above, in the sample support 1, the plurality of through holes 2c opening to the first surface 2a and the second surface 2b on a side opposite to the first surface 2a are formed on the substrate 2. For this reason, in a case where the sample support 1 is disposed on the sample S such that the second surface 2b of the substrate 2 faces the sample S, it is possible to move the component S1 of the sample S toward the first surface 2a side from the second surface 2b side through the through hole 2c by using a capillary action. Further, in a case where the first surface 2a is irradiated with the laser beam, the energy is transmitted to the component S1 of the sample S that is moved to the first surface 2a side via the conductive layer 4, and thus, it is possible to ionize the component S1 of the sample S. In addition, the sample support 1 includes the frame 3 provided in the peripheral portion of the substrate 2. For this reason, it is possible to improve the handleability of the sample support 1 by the frame 3. In addition, the frame 3 surrounds the effective region R in which the sample S is ionized when viewed in the thickness direction of the substrate 2, and the first marker 50 and the second marker 60 for recognizing the position in the effective region R are provided in the frame 3. Accordingly, the following effects are obtained.

That is, in this embodiment, in a case where the visual field of the camera 16 is narrow, and the irradiation range D2 is specified by observing the effective region R (the entire sample S), it is difficult to determine the irradiation position of the laser beam L. According to the sample support 1, it is possible for the mass spectrometry device 10 to recognize the irradiation range D2 of the laser beam L, by causing the camera 16 to perform scanning and by reading the first marker 50 and the second marker 60 provided in the frame 3. Accordingly, according to the sample support 1, it is possible to easily recognize the irradiation range D2 of the laser beam L. In particular, in a mass spectrometry device (an MALDI-MS device) that is used in existing MALDI, the number of pixels, the visual field, or the like of the camera that is attached to the device is optimized to be suitable for the observation of matrix crystals in the sample, and thus, there is a problem that the mass spectrometry device is not suitable for the determination of the irradiation position of the laser beam L and the observation of the entire sample for imaging. It is possible to solve the problem of the MALDI-MS device described above by applying the mass spectrometry device 10 described above to such an MALDI-MS device.

The width of the through hole 2c is 1 nm to 700 nm, and the thickness of the substrate 2 is 1 μm to 50 μm. Accordingly, it is possible to suitably attain the movement of the component S1 of the sample S by the capillary action described above.

The plurality of first markers 50 disposed along the X axis direction are provided in the first portion 31 extending along the X axis direction of the frame 3, and the plurality of second markers 60 disposed along the Y axis direction are provided in the second portion 32 extending along the Y axis direction orthogonal to the X axis direction of the frame 3. Accordingly, it is possible to recognize the position in the X axis direction by the first marker 50 and to recognize the position in the Y axis direction by the second marker 60. Accordingly, it is possible to easily grasp two-dimensional coordinates of the irradiation range D2 of the laser beam L (for example, the position of the start point P1, the position of the end point P2, or the like).

The first marker 50 and the second marker 60 are a numeric character. Accordingly, it is possible to attain a marker suitable for visual contact and/or for reading a device.

The first marker 50 includes the marker 51 for visual contact having the width w1 of greater than or equal to the predetermined value and the marker 52 for a device having the width w4 of less than the predetermined value, and the second marker 60 includes the marker 61 for visual contact having a width of greater than or equal to a predetermined value and a marker 62 for a device having a width of less than the predetermined value. Accordingly, the markers 51 and 61 for visual contact are read by the visual contact of the measurer, and thus, it is possible to determine in advance the irradiation range D2. Further, the markers 52 and 62 for a device corresponding to the irradiation range D2 determined by the measurer are read by the camera 16, and thus, it is possible for the mass spectrometry device 10 to recognize the irradiation range D2 of the laser beam L.

In addition, in the ionization method of the sample S described above, the plurality of through holes 2c opening to the first surface 2a and the second surface 2b on a side opposite to the first surface 2a are formed on the substrate 2. In a case where the sample support 1 is disposed on the sample S such that the second surface 2b of the substrate 2 faces the sample S, the component S1 of the sample S is moved toward the first surface 2a side from the second surface 2b side through the through hole 2c by the capillary action. Further, in a case where the first surface 2a is irradiated with the laser beam L while a voltage is applied to the conductive layer 4, the energy is transmitted to the component S1 of the sample S that is moved to the first surface 2a side. Accordingly, the component S1 of the sample S is ionized. In addition, it is possible for the mass spectrometry device 10 to easily recognize the irradiation range D2 of the laser beam L by scanning the first marker 50 and the second marker 60 provided in the frame 3.

In the ionization method, the first marker 50 includes the marker 51 for visual contact having the width w1 of greater than or equal to the predetermined value and the marker 52 for a device having the width w4 of less than the predetermined value, and the second marker 60 includes the marker 61 for visual contact having the width of greater than or equal to the predetermined value and the marker 62 for a device having the width of less than the predetermined value. Then, in the third step, the measurer determines the irradiation range D2, on the basis of the region D1 in the effective region R, and the markers 51 and 61 for visual contact, and the control unit 17 recognizes the irradiation range D2, on the basis of the position of the sample stage 18 when the markers 52 and 62 for a device corresponding to the irradiation range D2 determined by the measurer are read by the camera 16. Accordingly, it is possible to accurately attain both of the determination of the irradiation range D2 by the visual contact of the measurer and the recognition of the irradiation range D2 by a mechanical manipulation (marker scanning) of the mass spectrometry device 10, by the first marker 50 and the second marker 60 provided in the frame 3.

As described above, according to the mass spectrometry method described above, it is possible to accurately superimpose the optical image of the sample S on the distribution image, on the basis of the first marker 50 and the second marker 60 provided in the frame 3 of the sample support 1. As a result thereof, it is possible to visualize the mass distribution in each position of the sample S.

Modification Example

As described above, the embodiment of the present disclosure has been described, but the present disclosure is not limited to the embodiment described above, and the present disclosure can be variously modified within a range not departing from the gist thereof.

The substrate 2 may have conductivity, and in the mass spectrometry method, the first surface 2a may be irradiated with the laser beam L while a voltage is applied to the substrate 2. In a case where the substrate 2 has conductivity, it is possible to omit the conductive layer 4 in the sample support 1 and to obtain the same effects as those in the case of using the sample support 1 including the conductive layer 4 described above. Note that, irradiating the first surface 2a of the substrate 2 with the laser beam L indicates that the conductive layer 4 is irradiated with the laser beam L in a case where the sample support 1 includes the conductive layer 4, and indicates that the first surface 2a of the substrate 2 is irradiated with the laser beam L in a case where the substrate 2 has conductivity.

An example has been described in which the first marker 50 and the second marker 60 are a numeric character, but the first marker 50 and the second marker 60 may be various markers. The first marker 50 and the second marker 60, for example, may be at least one selected from a numeric character, a signal, and a letter. Even in this case, it is possible to attain a marker suitable for visual contact and/or for reading a device. Each of the marker 51 for visual contact, the marker 52 for a device, the marker 61 for visual contact, and the marker 62 for a device, for example, may be at least one selected from a numeric character, a signal, and a letter. In addition, such markers may include auxiliary information such as a graduation line.

An example has been described in which the first marker 50 and the second marker 60 are formed by making the surface 3c of the frame 3 concave and convex, but the first marker 50 and the second marker 60 may not be formed by making the surface 3c of the frame 3 concave and convex. The first marker 50 and the second marker 60, for example, may be formed by a print according to printing such as nanoprinting, photolithography using extreme ultraviolet (EUV) lithographic exposure, write according to a paint, black (oxidization) that is an example of a punch mark using a laser, foamed marking using a laser, or the like. In a case where the first marker 50 and the second marker 60 are formed by the foamed marking using the laser, the material of the frame 3 is a resin. The foamed marking using the laser is a method for foaming the resin by a laser beam. According to such a method, light is diffusely reflected in a foamed portion, and as a result thereof, the visibility of the foamed portion increases. Note that, in a case where the first marker 50 and the second marker 60 are not formed by making the surface 3c of the frame 3 concave and convex and the visibility is inhibited at the time of being covered with the conductive layer 4, the conductive layer 4 may not be formed in a region on the surface 3c of the frame 3, in which the first marker 50 and the second marker 60 are formed.

The frame 3 may include only one of the first marker 50 and the second marker 60. In this case, it is possible for the mass spectrometry device 10 to recognize a range in at least one direction of the irradiation range D2 in the X axis direction and the Y axis direction. In addition, the first marker 50 may be provided in both of the first portions 31 facing each other in the frame 3. Similarly, the second marker 60 may be provided in both of the second portions 32 facing each other in the frame 3.

The first marker 50 may include only one of the marker 51 for visual contact and the marker 52 for a device. In this case, it is preferable that the width of the first marker 50 can be read by any of the visual contact of the measurer and the camera 16 that is attached to the mass spectrometry device 10. Similarly, the second marker 60 may include only one of the marker 61 for visual contact and the marker 62 for a device. In this case, it is preferable that the width of the second marker 60 can be read by any of the visual contact of the measurer and the camera 16 that is attached to the mass spectrometry device 10.

An example has been described in which the determination of the irradiation range D2 by the measurer is performed before the glass slide 6, the sample support 1, and the sample S are mounted on the support portion 12 of the mass spectrometry device 10, but such determination of the irradiation range D2 by the measurer may be performed after the glass slide 6, the sample support 1, and the sample S are mounted on the support portion 12 of the mass spectrometry device 10.

An example has been described in which the optical image of the sample S and the sample support 1 is acquired in a state where the sample support 1 is disposed on the sample S (the sixth step) is performed after the distribution image is acquired (the fifth step), but such acquisition of the optical image may be performed at any time after the sample support 1 is disposed on the sample S (the second step). For example, such an optical image may be acquired before the glass slide 6, the sample support 1, and the sample S are mounted on the support portion 12 of the mass spectrometry device 10.

In the third step, as with the start point P1 and the end point P2, the coordinates (X3,Y3) of the turn-around point P3 (refer to FIG. 6) may be grasped, and the coordinates of the turn-around point P3 of the irradiation range D2 may be recognized (stored), on the basis of the position (x2,y1) of the sample stage 18 when the markers 52 and 62 for a device corresponding to the coordinates (X3,Y3) of the turn-around point P3 are read. In a case where there is the information of the turn-around point P3, in addition to the start point P1 and the end point P2, it is possible to more accurately superimpose the optical image of the sample S on the distribution image. For example, in a case where the optical image is superimposed on the distribution image, and then, it is necessary to match the direction such as an up-down direction and a right-left direction, it is possible to suitably superimpose the optical image on the distribution image, on the basis of the information of three points not on a straight line (the start point P1, the end point P2, and the turn-around point P3). In addition, in a case where the irradiation range D2 is not in a rectangle shape (for example, the irradiation range D2 is in a parallelogram shape in which one side portion of four side portions intersects with the Y axis direction), the information of the turn-around point P3 may be read in a case where three or more reference points (coordinates) are necessary for specifying the irradiation range D2.

An example has been described in which the control unit 17 moves the sample stage 18 such that the camera 16 scans the markers 52 and 62 for a device, but the scanning of the markers 52 and 62 for a device by the camera 16 can be carried out by operating at least one of the sample stage 18 and the camera 16. In a case where the camera 16 is operated, the control unit 17 recognizes the irradiation range D2, on the basis of the position of the camera 16 when the markers 52 and 62 for a device corresponding to the irradiation range D2 determined by the measurer is read by the camera 16. Accordingly, as with a case where the sample stage 18 is operated, it is possible to accurately attain both of the determination of the irradiation range D2 by the visual contact of the measurer and the recognition of the irradiation range D2 by the mechanical manipulation (the marker scanning) of the mass spectrometry device 10, by the first marker 50 and the second marker 60 provided in the frame 3.

REFERENCE SIGNS LIST

1: sample support, 2: substrate, 2a: first surface, 2b: second surface, 2c: through hole, 3: frame (frame body), 4: conductive layer, 10: mass spectrometry device, 13: irradiation unit, 16: camera (scanning unit), 17: control unit, 31: first portion, 32: second portion, 50: first marker, 51, 61: marker for visual contact, 52, 62: marker for device, 60:

second marker, D1: region (existence range), D2: irradiation range, L: laser beam (energy ray), R: effective region (ionization region), S: sample, S1: component, S2: sample ion, w1, w4: width.

The invention claimed is:

1. A sample support for sample ionization, comprising:
a substrate formed with a plurality of through holes opening to a first surface and a second surface on a side opposite to the first surface;
a conductive layer provided not to block the through hole in the first surface; and
a frame body provided in a peripheral portion of the substrate to surround an ionization region in which a sample is ionized when viewed in a thickness direction of the substrate,
wherein a marker for recognizing a position in the ionization region is provided in the frame body,
wherein the marker is concave or convex formed on the surface of the frame.

2. The sample support according to claim 1,
wherein a plurality of first markers disposed along a first direction are provided in a portion of the frame body extending along the first direction, and
a plurality of second markers disposed along a second direction orthogonal to the first direction are provided in a portion of the frame body extending along the second direction.

3. The sample support according to claim 2,
wherein each of the plurality of first markers is a numeric character, and
each of the plurality of second markers is a letter.

4. The sample support according to claim 1,
wherein the marker is covered by the conductive layer.

5. The sample support according to claim 1,
wherein the marker includes a marker for visual contact having a width of greater than or equal to a predetermined value and a marker for a device having a width of less than the predetermined value.

6. A sample ionization method of an ionization device including an irradiation unit configured to apply an energy ray, a scanning unit configured to scan the marker provided in the frame body, and a control unit configured to control an operation of the irradiation unit, the method comprising:
a first step of preparing a sample and the sample support according to claim 1;
a second step of disposing the sample support on the sample such that the second surface faces the sample;
a third step of causing the control unit to recognize an irradiation range of the energy ray in the ionization region by causing the scanning unit to scan the marker provided in the frame body; and
a fourth step of ionizing a component of the sample moved to the first surface side through the through hole in the irradiation range by causing the control unit to operate the irradiation unit such that the first surface in the irradiation range is irradiated with the energy ray while a voltage is applied to the conductive layer.

7. The sample ionization method according to claim 6,
wherein the marker includes a marker for visual contact having a width of greater than or equal to a predetermined value and a marker for a device having a width of less than the predetermined value, and
in the third step, a measurer determines the irradiation range, on the basis of an existence range of the sample in the ionization region and the marker for visual contact, and the control unit recognizes the irradiation range, on the basis of a position of the scanning unit when the marker for a device corresponding to the irradiation range determined by the measurer is read by the scanning unit.

8. A mass spectrometry method, comprising:
each of the steps of the sample ionization method according to claim 7;
a fifth step of detecting the ionized component and of acquiring a distribution image indicating a mass distribution of the sample in the irradiation range;
a sixth step of acquiring an optical image including the sample and the sample support, in a state in which the sample support is disposed on the sample; and
a seventh step of superimposing the optical image on the distribution image such that the irradiation range of the optical image overlaps with the distribution image, on the basis of the marker in the optical image.

9. A mass spectrometry method, comprising:
each of the steps of the sample ionization method according to claim 6;
a fifth step of detecting the ionized component and of acquiring a distribution image indicating a mass distribution of the sample in the irradiation range;
a sixth step of acquiring an optical image including the sample and the sample support, in a state in which the sample support is disposed on the sample; and
a seventh step of superimposing the optical image on the distribution image such that the irradiation range of the optical image overlaps with the distribution image, on the basis of the marker in the optical image.

10. A sample support for sample ionization, comprising:
a substrate having conductivity, and formed with a plurality of through holes opening to a first surface and a second surface on a side opposite to the first surface; and
a frame body provided in a peripheral portion of the substrate to surround an ionization region in which a sample is ionized when viewed in a thickness direction of the substrate,
wherein a marker for recognizing a position in the ionization region is provided in the frame body,
wherein the marker is concave or convex formed on the surface of the frame.

11. A sample ionization method of an ionization device including an irradiation unit configured to apply an energy ray, a scanning unit configured to scan the marker provided in the frame body, and a control unit configured to control an operation of the irradiation unit, the method comprising:
a first step of preparing a sample and the sample support according to claim 10;
a second step of disposing the sample support on the sample such that the second surface faces the sample;
a third step of causing the control unit to recognize an irradiation range of the energy ray in the ionization region by causing the scanning unit to scan the marker provided in the frame body; and
a fourth step of ionizing a component of the sample moved to the first surface side through the through hole in the irradiation range by causing the control unit to operate the irradiation unit such that the first surface in the irradiation range is irradiated with the energy ray while a voltage is applied to the substrate.

12. The sample ionization method according to claim 11,
wherein the marker includes a marker for visual contact having a width of greater than or equal to a predetermined value and a marker for a device having a width of less than the predetermined value, and in the third step, a measurer determines the irradiation range, on the basis of an existence range of the sample in the ionization region and the marker for visual contact, and the control unit recognizes the irradiation range, on the basis of a position of the scanning unit when the marker for a device corresponding to the irradiation range determined by the measurer is read by the scanning unit.

13. A mass spectrometry method, comprising:

each of the steps of the sample ionization method according to claim 12;

a fifth step of detecting the ionized component and of acquiring a distribution image indicating a mass distribution of the sample in the irradiation range;

a sixth step of acquiring an optical image including the sample and the sample support, in a state in which the sample support is disposed on the sample; and a seventh step of superimposing the optical image on the distribution image such that the irradiation range of the optical image overlaps with the distribution image, on the basis of the marker in the optical image.

14. A mass spectrometry method, comprising:

each of the steps of the sample ionization method according to of claim 11;

a fifth step of detecting the ionized component and of acquiring a distribution image indicating a mass distribution of the sample in the irradiation range;

a sixth step of acquiring an optical image including the sample and the sample support, in a state in which the sample support is disposed on the sample; and a seventh step of superimposing the optical image on the distribution image such that the irradiation range of the optical image overlaps with the distribution image, on the basis of the marker in the optical image.

* * * * *